(12) United States Patent
Smith et al.

(10) Patent No.: US 10,233,811 B2
(45) Date of Patent: Mar. 19, 2019

(54) SOOT MODEL CONFIGURABLE CORRECTION BLOCK (CCB) CONTROL SYSTEM

(71) Applicant: GM Global Technology Operations LLC, Detroit, MI (US)

(72) Inventors: Michael A. Smith, Clarkston, MI (US); Pu Sun, Canton, MI (US); Harish Kohli, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/470,327

(22) Filed: Mar. 27, 2017

(65) Prior Publication Data
US 2018/0274422 A1    Sep. 27, 2018

(51) Int. Cl.
| | | |
|---|---|---|
| F01N 3/00 | (2006.01) |
| F01N 3/20 | (2006.01) |
| F01N 3/023 | (2006.01) |
| F01N 3/035 | (2006.01) |
| F01N 3/10 | (2006.01) |
| F01N 9/00 | (2006.01) |

(52) U.S. Cl.
CPC ........... *F01N 3/2066* (2013.01); *F01N 3/023* (2013.01); *F01N 3/035* (2013.01); *F01N 3/106* (2013.01); *F01N 9/002* (2013.01); *F01N 2610/02* (2013.01); *F01N 2610/148* (2013.01); *F01N 2900/08* (2013.01); *F01N 2900/1616* (2013.01)

(58) Field of Classification Search
USPC .................. 60/274, 286, 295, 297, 301, 303
See application file for complete search history.

(56) References Cited

U.S. PATENT DOCUMENTS

| | | | | |
|---|---|---|---|---|
| 7,500,358 B2* | 3/2009 | Singh | ................... | F01N 3/0842 60/276 |
| 8,051,645 B2* | 11/2011 | Chamarthi | .............. | F01N 9/002 60/274 |
| 8,146,346 B2* | 4/2012 | Ishibashi | ............... | F01N 13/009 60/274 |
| 8,739,517 B2* | 6/2014 | Xu | ..................... | B01D 53/9431 60/295 |
| 2005/0022520 A1* | 2/2005 | Shirakawa | ............ | F01N 3/0222 60/297 |
| 2009/0250041 A1* | 10/2009 | Minami | ............. | B01D 53/9409 123/568.12 |

* cited by examiner

*Primary Examiner* — Binh Q Tran
(74) *Attorney, Agent, or Firm* — Cantor Colburn LLP

(57) ABSTRACT

An engine control system includes a selective catalyst reduction (SCR) device that reduces nitrogen oxide (NOx) in exhaust gas in the presence of the reductant. A particulate filter (PF) is disposed downstream from the SCR device to collect particulate matter from the exhaust gas stream. The engine control system further includes an electronic hardware that calculates a particulate matter load value indicating an amount of particulate matter collected in the PF, and calculate a CCB value that compensates for pressure differential variations across the PF. The controller further calculates a CCB correction value that modifies the CCB value and compensates for an amount of reductant that slips from the SCR device and induces the pressure differential variations. In this manner, the electronic hardware controller can control a regeneration system to increase the temperature of the PF to burn off particulate matter from the PF based on the modified CCB value.

20 Claims, 2 Drawing Sheets

SOOT MODEL CONFIGURABLE CORRECTION BLOCK (CCB) CONTROL SYSTEM

INTRODUCTION

The present disclosure relates to automotive vehicle systems, and more particularly, to automotive vehicle exhaust treatment systems.

Automotive vehicles include exhaust treatment systems for removing particulates and reducing regulated emissions from engine exhaust gas before expelling the exhaust gas from the vehicle. These exhaust treatment systems typically include a selective catalyst reduction (SCR) device and a particulate filter (PF). The SCR device is configured to convert oxides of nitrogen (NOx) into diatomic nitrogen ($N_2$) and water ($H_2O$) in the presence of a reductant such as ammonia ($NH_3$), for example, thereby reducing the level of NOx emissions expelled from the vehicle. Because $NH_3$ assists in inducing the NOx conversion, a reductant delivery system can be included to inject the $NH_3$ into the exhaust stream.

The PF is configured to collect particulate matter (e.g., soot) remaining in the exhaust stream. As the PF collects particulate matter, back pressure increases which can lead to fuel inefficiencies if not relieved. In order to remove the collected soot, the PF is often times regenerated by converting the trapped soot to carbon dioxide in the presence of heat. The amount of soot to remove during the regeneration process is often determined based on a pressure-based soot model stored, for example, in the engine control unit (ECU).

In some exhaust treatment systems, the PF is constructed as a continuously regenerating-type PF assembly that is provided with a close-coupled downstream oxidation catalyst (OC), sometimes referred to a second OC (OCII). The close-coupled OC is located upstream from the filter and in close proximity to the inlet of the filter. This arrangement between the close-coupled OC and the filter is sometimes referred to as a continuously regenerating trap (CRT). The CRT, however, can be susceptible to inaccurate modeling, especially during passive PF regenerative events which cause the formation of an increased porous soot layer on the PF. Thus, conventional exhaust treatment systems may include a configurable correction block (CCB) controller that executes an algorithm to compensate or correct for the inaccurate modeling that impacts the pressure-based soot loading model, and in particular, affects CRT regeneration.

SUMMARY

In one exemplary embodiment, a vehicle comprises an internal combustion engine, a selective catalyst reduction (SCR) device, a particulate filter (PF), and a PF regeneration system. The SCR device receives reductant and reduces nitrogen oxide (NOx) in exhaust gas generated by the internal combustion engine in the presence of the reductant. The PF is disposed downstream from the SCR device and collects particulate matter from the exhaust gas stream. The regeneration system is configured to increase a temperature of the PF and regenerate the PF in response to the increased temperature of the PF. The vehicle further comprises an electronic hardware controller configured to calculate a particulate matter load value indicative of an amount of particulate matter collected in the PF, to calculate a configurable correction block (CCB) value that modifies the particulate matter load value and compensates for pressure differential variations across the PF, and to calculate a CCB correction value that modifies the CCB value and compensates for an amount of reductant that slips from the SCR device and induces the pressure differential variations. The electronic hardware controller controls the regeneration system to increase the temperature of the PF to burn off particulate matter from the PF based on the modified CCB value.

The vehicle further comprises a feature, wherein the PF and the SCR device are arranged according to a SCR forward exhaust treatment architecture.

The vehicle further comprises a feature, wherein the SCR forward exhaust treatment architecture includes a first oxidation catalyst (OC) interposed between the internal combustion engine and an inlet of the SCR device, and a second OC interposed an outlet of the SCR device and the PF.

The vehicle further comprises an SCR inlet temperature sensor configured to detect an inlet temperature at the inlet of the SCR device, and a reductant load sensor configured to detect an amount of the reductant stored on the SCR device, wherein the CCB correction value is based on the inlet temperature, the amount of reductant stored on the SCR device, and a reductant storage setpoint.

The vehicle further comprises a feature, wherein the reductant storage setpoint is based on an expected amount of reductant stored on the SCR device at a given inlet temperature of the SCR device.

The vehicle further comprises a feature, wherein the controller selectively generates the CCB correction value in response to detecting a reductant slippage condition.

The vehicle further comprises a feature, wherein the reductant slippage condition is based on differential value between the reductant storage set point and the amount of reductant stored on the SCR device at a given inlet SCR temperature.

In another exemplary embodiment, an automotive vehicle control system comprises a SCR inlet temperature sensor and a reductant load sensor. The SCR inlet temperature sensor is configured to detect an inlet temperature of a selective catalyst reduction (SCR) device. The reductant load sensor is configured to detect an amount of reductant stored on the SCR device. The vehicle control system further comprises a particulate matter (PM) load controller; a configurable correction block (CCB) controller, a CCB correction controller, and an engine controller. The PM load controller is configured to calculate a particulate matter load value indicative of an amount of particulate matter collected in a particulate filter (PF) installed on the vehicle. The CCB controller is configured to calculate a CCB value that modifies the particulate matter load value and compensates for pressure differential variations across the PF. The CCB correction controller is configured to calculate a CCB correction value that modifies the CCB value and compensates for an amount of reductant that slips from the SCR device. The engine controller is configured to control a regeneration system installed on the vehicle to increase the temperature of the PF thereby burning off particulate matter from the PF based on a modified CCB value.

The vehicle control system further comprises a feature, wherein the CCB correction controller generates the correction signal based on a temperature signal generated by the SCR inlet temperature sensor, and a difference between an actual amount of ammonia ($NH_3$) stored on the SCR device at a given driving condition and a $NH_3$ set point of the SCR device at the given driving condition.

The vehicle control system further comprises a feature, wherein the PM load controller determines the PM load based on a comparison between a PM load model and at least one measured physical property of the vehicle.

The vehicle control system further comprises a feature, wherein the at least one measured physical properties of the vehicle includes at least one of a pressure differential signal indicating a pressure differential across the PF, a PF temperature signal indicating the temperature of the PF, and a mass air flow (MAF) rate of air delivered to an engine of the vehicle.

The vehicle control system further comprises a feature, wherein the CCB correction controller stores a numerical correction look-up table (LUT) that is utilized to determine a correction value.

The vehicle control system further comprises a feature, wherein the CCB correction controller applies the compensation signal to the corrected NOx level signal 225 and the PM load signal 230 to generate a corrected signal, and wherein the CCB controller receives the corrected signal and generates the modified CCB value based on the corrected signal.

In yet another exemplary embodiment, a method is provided that corrects a configurable correction block (CCB) value to reduce ammonia slip ($NH_3$) from a selective catalyst reduction (SCR) device installed on an automotive vehicle. The method comprises delivering a reductant into exhaust gas generated by an internal combustion engine of the vehicle, loading the reductant on a selective catalyst reduction (SCR) device, and reducing, via the SCR device, nitrogen oxide (NOx) contained in exhaust gas produced based on the reductant. The method further includes loading particulate matter contained in the exhaust gas in a particulate filter (PF) disposed downstream from the SCR device, and calculating a particulate matter load value indicative of an amount of particulate matter collected in the PF. The method further includes calculating a CCB value that modifies the particulate matter load value and compensating for pressure differential variations across the PF. The method further includes calculating a CCB correction value that modifies the CCB value and compensating for an amount of reductant that slips from the SCR device thereby inducing the pressure differential variations. The method further includes increasing a temperature of the PF to burn off the loaded particulate matter based on the modified CCB value.

The method further comprises arranging the PF and the SCR device according to a SCR forward exhaust treatment architecture.

The method further comprises providing the SCR forward exhaust treatment architecture such that a first oxidation catalyst (OC) is interposed between the internal combustion engine and an inlet of the SCR device, and a second OC interposed an outlet of the SCR device and the PF.

The method further comprises detecting an inlet temperature at the inlet of the SCR device, detecting an amount of the reductant stored on the SCR device, and calculating the CCB correction value based on the inlet temperature, the amount of reductant stored on the SCR device, and a reductant storage setpoint.

The method further comprises determining the reductant storage setpoint based on an expected amount of reductant stored on the SCR device at a given inlet temperature of the SCR device.

The method further comprises selectively generating the CCB correction value in response to detecting a reductant slippage condition.

The method further comprises determining the reductant slippage condition based on differential value between the reductant storage set point and the amount of reductant stored on the SCR device at a given inlet SCR temperature.

The above features are readily apparent from the following detailed description when taken in connection with the accompanying drawings.

BRIEF DESCRIPTION OF THE DRAWINGS

Other features and details appear, by way of example only, in the following detailed description of embodiments, the detailed description referring to the drawings in which.

DETAILED DESCRIPTION

Figure 1:
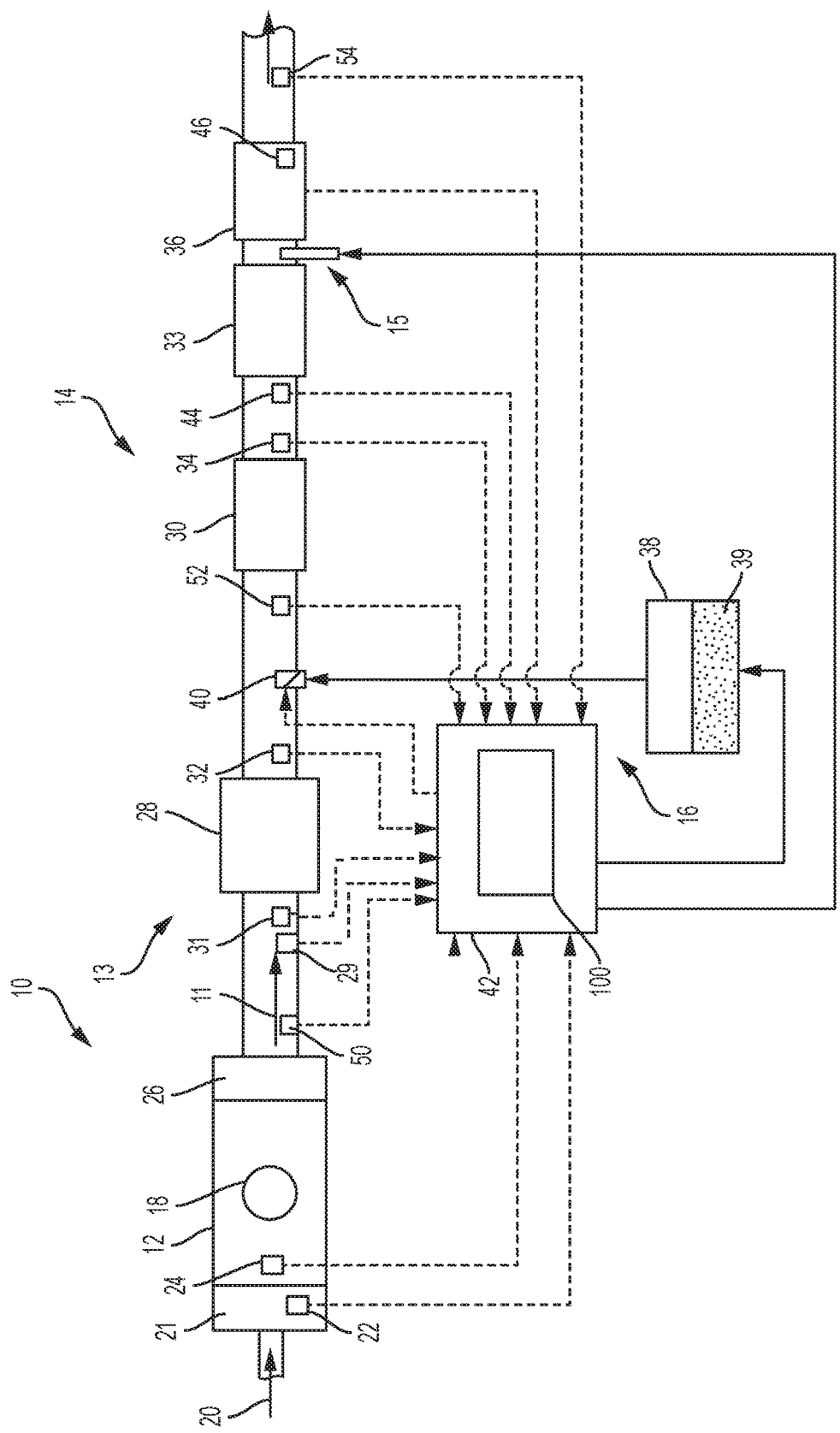
FIG. 1 is a functional block diagram of an engine control system including an engine control unit (ECU) having a CCB module, according to a non-limiting embodiment.

The following description is merely exemplary in nature and is not intended to limit the present disclosure, its application or uses. It should be understood that throughout the drawings, corresponding reference numerals indicate like or corresponding parts and features.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Exhaust treatment systems can be arranged according to various different architectures. In a SCR forward architecture, for example, the SCR device is disposed upstream from one or more exhaust treatment devices such as, for example, a PF or a downstream OC that is combined with the PF (i.e., a OC/PF). Certain operating conditions of the vehicle can promote slippage of reductant (e.g., $NH_3$) from the SCR device. For instance, an $NH_3$ slippage condition can occur when a certain amount of $NH_3$ is stored in the SCR device while the SCR device exists at a "slippage temperatures". Consequently, the occurrence of an $NH_3$ slippage condition promotes the $NH_3$ to release (i.e., slip) from the SCR device instead of remain loaded thereon. At a given temperature (e.g., 400 degrees Celsius), $NH_3$ is more likely to slip from the SCR device when a higher amount of $NH_3$ (e.g. 0.5 grams) is stored in the SCR device compared to when a lower amount of $NH_3$ (e.g., 0.1 grams) is stored in the SCR device.

In an SCR forward arrangement, slipped $NH_3$ encounters the OC/PF assembly where it is converted into NO and $N_2O$, and the NO is oxidized into $NO_2$. However, the resulting $NO_2$ can reduce the pressure differential across the OC/PF which causes errors in the CCB correction applied to the pressure-based soot model. Thus, an inaccurate CCB correction of the pressure-based soot model can cause incorrect OC/PF regeneration leading to reduced fuel economy. To compensate for inaccuracies in the CCB correction, at least one non-limiting embodiment modifies the CCB correction using a CCB compensation value that is function of the SCR temperature with respect to an $NH_3$ storage error of the SCR device.

Referring now to FIG. 1, an engine system 10 is schematically illustrated. The engine system 10 includes an internal combustion engine 12 and an exhaust system 13. The exhaust system 13 described herein can be implemented with various types of engine systems including, but not limited to, diesel engine systems, and gasoline engine systems. The engine systems may also include hybrid engine systems that implement an internal combustion engine in conjunction with an electric motor.

The exhaust system 13 further includes an exhaust treatment system 14 and a dosing system 16. The engine 12 includes one or more cylinders 18, an intake manifold 21, a mass air flow (MAF) sensor 22 and an engine speed sensor 24. Air flows into the engine 12 through the intake manifold 21 and is monitored by the MAF sensor 22. The air is directed into the cylinders 18 and is combusted with fuel to drive pistons (not shown). Although a single cylinder 18 is illustrated, it can be appreciated that the engine 12 may include additional cylinders 18. For example, the engine system 10 can implement an engine 12 having 2, 3, 4, 5, 6, 8, 10, 12 and 16 cylinders.

Exhaust gas 11 is produced inside the cylinder 18 as a result of the combustion process. The exhaust treatment system 14 treats the exhaust gas 11 delivered via an exhaust manifold 26 before the exhaust gas 11 is released to the atmosphere. In at least one embodiment, the exhaust treatment system 14 includes an upstream oxidation catalyst (OC) device 28 such as, for example, a close-coupled DOC (CCDOC), a selective catalyst reduction (SCR) device 30, a downstream OC device 33, and a particulate filter (PF) 36 such as, for example, a diesel PF (DPF). When arranged as a CCDOC, the CCDOC 5284 may be mounted in close proximity, i.e., close-coupled, to the exhaust manifold 26 in order to reduce loss of thermal energy from the flow of exhaust gas 11 to the ambient prior to the gas reaching the CCDOC. Although a SCR-forward arrangement (i.e., OC 28-SCR 30-OC 33/PF 36) is illustrated, the exhaust gas treatment system 14 can be constructed according to other known architectures such as, for example, a PF-forward arrangement, and an OC-forward arrangement. As can be appreciated, the exhaust treatment system 14 of the present disclosure may include other exhaust treatment devices (not shown).

The upstream OC device 28 can be of various flow-through, oxidation catalyst devices known in the art. In various embodiments, the upstream OC device 28 may include a flow-through metal or ceramic monolith OC substrate (not shown) that is wrapped in an intumescent mat or other suitable support that expands when heated, securing and insulating the substrate. The OC substrate may be packaged in a stainless steel shell or canister having an inlet in fluid communication with the exhaust manifold 26. The OC substrate can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The upstream OC device 28 is useful in treating unburned gaseous and non-volatile HC and CO, which are oxidized to form carbon dioxide and water. In at least one embodiment, the upstream OC device 28 is constructed as a CCDOC device 28, which is relatively smaller in size compared to the downstream OC 33 thereby allowing packaging near the engine 12. The close-coupled arrangement of the CCDOC device 28 with respect to the engine manifold 26 also ensures that the CCDOC device 28 consistently lights off very quickly. Accordingly, there is little risk of OC substrate temperatures dropping below the light-off point at any time or under any engine operating conditions.

The SCR device 30 may be disposed downstream of the upstream OC device 28, and is configured to reduce NOx constituents in the exhaust gas 11. As can be appreciated, the SCR device 30 can be constructed of various materials known in the art. In various embodiments, for example, the SCR device 30 may be constructed using a wall-flow or flow-through monolith SCR substrate (not shown), such as, for example, wound or packed fiber filters, open cell foams, sintered metal fibers, etc. In various embodiments, the SCR device 30 includes an SCR catalyst composition (e.g., a SCR washcoat) applied to the SCR substrate. The SCR device 30 may utilize a reductant, such as ammonia ($NH_3$) to reduce the NOx. More specifically, the SCR device 30 catalyst composition can contain a zeolite and one or more base metal components such as iron (Fe), cobalt (Co), copper (Cu) or vanadium (V) which can operate efficiently to convert NOx constituents in the exhaust gas 11 in the presence of $NH_3$. The reductant utilized by the SCR device 30 may be in the form of a gas, a liquid, or an aqueous urea solution and may be mixed with air to aid in the dispersion of an injected spray generated by a reductant supply system, as discussed in greater detail below.

The downstream OC 33 is disposed downstream from the SCR device 30. In at least one embodiment, the downstream OC 33 is close-coupled to the PF 36, i.e., the OC 33 may be mounted in close proximity to the inlet of the PF 36. The downstream OC 33 can be constructed similar to the upstream OC device 28, and is configured to further reduce the level of hydrocarbons delivered to the PF 36.

The PF 36 may be disposed downstream from the SCR device 30, and filters the exhaust gas 11 of carbon and other particulate matter (e.g. soot). The PF 36 has an inlet in fluid communication with the outlet of the downstream OC 33 to receive the exhaust gas 11. As described above, the OC 33 can be with the inlet of the PF 36. This arrangement between the OC 33 and the PF 36 is sometimes referred to as a continuously regenerating-type PF device, or a continuously regenerated trap (CRT).

According to at least one exemplary embodiment, the PF 36 may be constructed using a ceramic wall flow monolith exhaust gas substrate (not shown) that traps particulate matter (e.g., soot) as the exhaust gas 11 travels therethrough. The substrate can be wrapped in an intumescent or non-intumescent material (not shown) that may expand when heated to secure and insulate the PF substrate which is packaged in a rigid, heat resistant shell or canister. It is appreciated that the ceramic wall flow monolith filter substrate is merely exemplary in nature and that the PF 36 may include other filter devices such as wound or packed fiber filters, open cell foams, sintered metal fibers, etc. To enhance the performance of the PF 36, a catalytic material (hereinafter referred to as a PF washcoat) may be applied to the substrate. The PF washcoat promotes oxidation of hydrocarbons, carbon monoxide (CO), soot and particulate matter trapped in the PF substrate under selected conditions, which enhances exothermic reactions occurring in the PF. Accordingly, a catalyzed PF emits increased temperatures as compared to an uncatalyzed PF.

The exhaust treatment system 14 can also include a PF regeneration system 15. The PF regeneration system 15 is configured to perform a regeneration process that regenerates the PF 36 by burning off the particulate matter (e.g., soot) trapped in the PF substrate as known to those ordinarily skilled in the art.

The exhaust treatment system 14 further includes various sensors configured to monitor conditions of the exhaust system 13. For instance, the exhaust treatment system 14 includes a pressure sensor 29, an exhaust temperature sensor 31, an SCR inlet temperature sensor 32, and an SCR outlet temperature sensor 34.

The pressure sensor 29 can determine a current ambient atmospheric pressure realized by the vehicle. The exhaust temperature sensor 31 may be positioned between the engine 12 and the upstream OC device 28. The SCR inlet temperature sensor 32 is located upstream from the SCR device 30 to monitor the temperature change at the inlet of the SCR device 30. The SCR outlet temperature sensor 34 is located downstream from the SCR device 30 to monitor the temperature at the outlet of the SCR device 30. Although the exhaust treatment system 14 is illustrated as including the inlet and outlet temperature sensors 32, 34 arranged outside the SCR device 30, the inlet and outlet temperature sensors 32, 34 can be located inside the SCR device 30 to monitor the temperature of the exhaust at the inlet and outlet of the SCR device 30.

The dosing system 16 includes a reductant supply 38 and a dosing injector 40. The reductant supply 38 stores a reductant 39 such as, for example, urea. The dosing injector 40 injects reductant 39 into the exhaust gas 11 according to a $NH_3$ set point of the SCR device 30. The $NH_3$ set point indicates a target amount of reductant to inject into the exhaust gas at a given operating condition that will produce a maximum NOx conversion rate while minimizing the potential for $NH_3$ slip from the SCR device 30. In at least one embodiment, a plurality of $NH_3$ set points are determined via off-line testing, and are stored in a control module such as an engine control unit (ECU) 42, for example. The reductant 39 mixes with the exhaust gas 11 and further reduces the emissions when the mixture is exposed to the SCR device 30. For instance, the mixture of exhaust gas 11 and reductant 39 (e.g., urea) chemically reacts with high-exhaust temperatures to convert urea into parts of $NH_3$, which are loaded in the SCR device 30. NOx than chemically reacts with $NH_3$ loaded in the SCR device 30, and is converted into diatomic nitrogen ($N_2$) and water ($H_2O$), thereby reducing the level of NOx emissions expelled from the exhaust system 13.

An exhaust gas flow rate sensor 44 may generate a signal corresponding to the flow of exhaust in the exhaust system 13. Although the sensor 44 is illustrated between the SCR device 30 and the PF 36, various other locations within the exhaust system 13 may be used for measurement including downstream of the exhaust manifold 26 and upstream of the SCR device 30. A PF temperature sensor 46 generates a particulate filter temperature corresponding to a measured temperature of the PF 36. The PF temperature sensor 46 may be disposed on or within the PF 36. The PF temperature sensor 46 may also be located upstream or downstream of the PF 36.

Other sensors in the exhaust system 13 may include an upstream NOx sensor 50 that generates a NOx signal based on a concentration of NOx present in the exhaust gas 11. A downstream NOx sensor 52 may be positioned downstream from the OC device 28 to measure a concentration of NOx in the exhaust gas 11. In addition, an $NH_3$ sensor 54 generates a signal corresponding to the amount of ammonia within the exhaust gas 11. The $NH_3$ sensor 54 is optional, but can be used to simplify the control system due to the ability to discern between NOx and $NH_3$.

The ECU 42, for example, regulates and controls various operations of the engine system 10 including, but not limited to, operation and fuel injection timing of the engine 12, reductant injection time and dosing amounts by the dosing system 16, regeneration timing for regenerating the PF 36, etc. For instance, the control module 42 can store various algorithms and models that assist in controlling the operation of the exhaust treatment system 14 such as, for example, a pressure-based soot model that controls regeneration timing of the PF 36 and duration of regeneration during a given driving condition.

The control module 42 includes a CCB control unit 100 that stores a CCB algorithm to compensate or correct modeling inaccuracies that negatively impact the pressure-based soot loading model and affect CRT regeneration. Unlike conventional ECUs, however, the CCB control unit 100 is configured to correct errors in the CCB algorithm caused by $NH_3$ slip from the SCR device 30, thereby correcting PF regeneration and improving overall fuel economy of the vehicle.

In at least one embodiment, the CCB control unit 100 is configured to predict $NH_3$ slip from the SCR device 30, and modify the measured reading of the downstream NOx sensor 52. In turn, the modified downstream NOx senor measurement is utilized to dynamically apply a correction to the CCB algorithm. In this manner, errors in $NH_3$ slip calculations caused by inaccurate soot model CCB corrections can be reduced or avoided all together. In at least one embodiment, the CCB control unit 100 corrects the CCB algorithm based on inlet NOx flux (i.e., the NOx flow rate measured in grams per second) detected by the upstream NOx sensor 50 during $NH_3$ slippage conditions. The CCB module 100 corrects the CCB algorithm by calculating an expected $NH_3$ slip value to predict a $NH_3$ slippage condition based on a temperature of the SCR device 30 and an amount of $NH_3$ stored on the SCR device 30 at a given driving condition. This calculated $NH_3$ slip value is then applied to measured values that are output from the downstream NOx sensor 52 to compensate for errors in the CCB algorithm that can occur during a given predicted $NH_3$ slippage condition.

Figure 2:
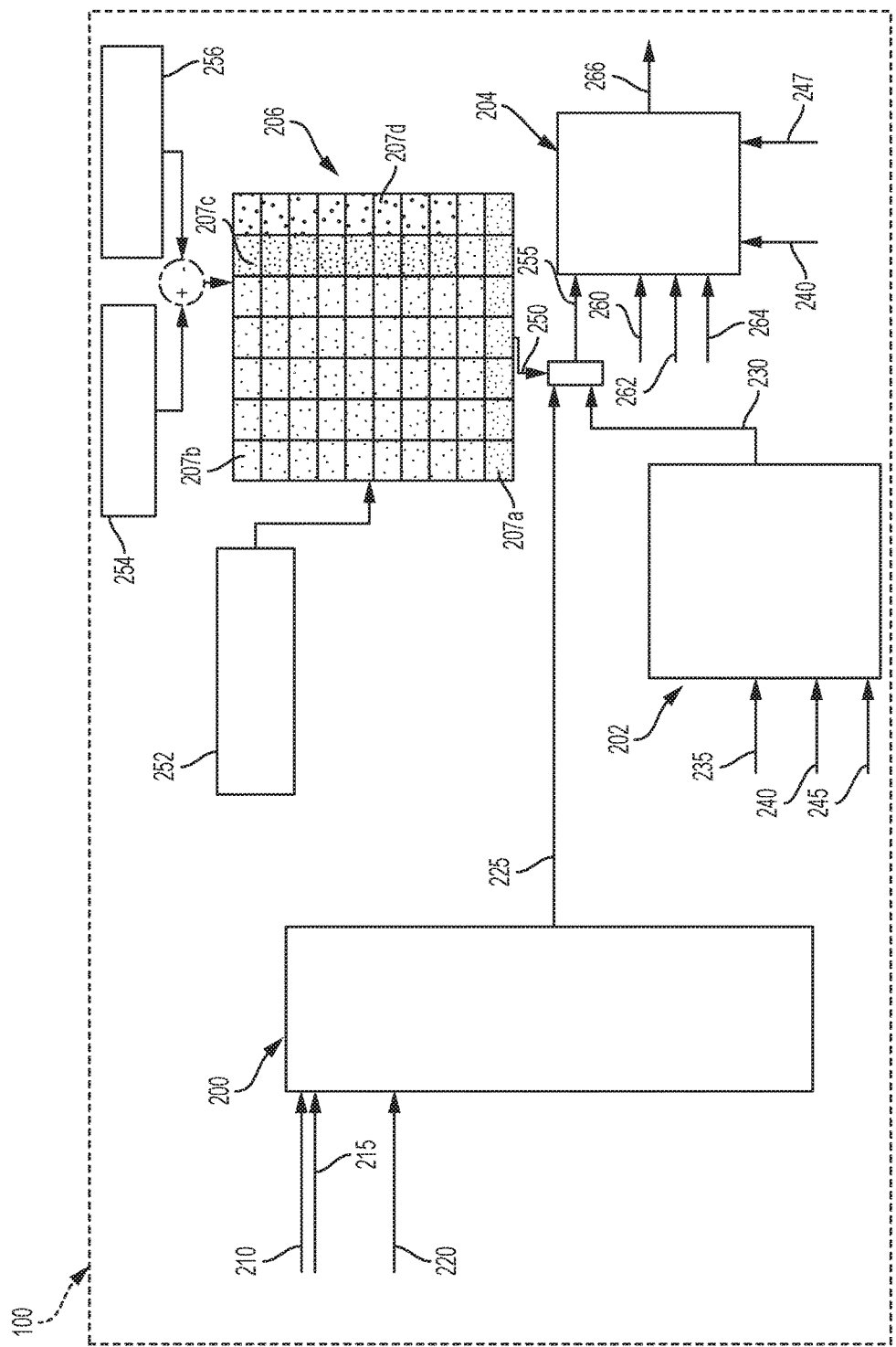
FIG. 2 is a functional block diagram of a CCB module including a CCB correction controller configured to correct a $NH_3$ slip measurements according to a non-limiting embodiment.

Turning now to FIG. 2, the CCB control unit 100 is illustrated according to a non-limiting embodiment. The CCB control unit 100 includes an altitude NOx controller 200, a particulate matter (PM) load controller 202, and a CCB controller 204. The altitude NOx controller 200 calculates an altitude correction factor that is applied to the measured NOx level indicated by the downstream NOx sensor 52. At higher altitudes, the air pressure and air density is lower than altitudes closer to sea level. As a result, NOx emissions may vary between vehicles operating at higher altitudes compared to vehicles operating at lower altitudes. Accordingly, the altitude NOx controller 200 receives a PF temperature signal 210 output from the PF temperature sensor 46 which indicates a current temperature of the PF 36, a NOx outlet signal 220 output from the downstream NOx sensor 54 which indicates a measured NOx level in the exhaust gas stream 11 exiting the exhaust treatment system 14, and an ambient pressure signal 215 output from the pressure sensor 29 which indicates the ambient atmospheric pressure realized by the vehicle during a given driving condition. Based on the PF temperature signal 210, the ambient pressure signal 215 and the NOx outlet signal 220, the altitude NOx controller 200 generates a corrected NOx level signal 225 which indicates the level of NOx in the treated exhaust gas stream 11 exiting the vehicle, while taking into account the current surrounding atmospheric pressures.

The PM load controller 202 determines the PM load (e.g. soot load) on the PF 36 and outputs a PM load signal 230.

In at least one embodiment, the PM load controller 202 determines the PM load according to a PM load model. The PM load model utilizes various measured physical properties of the vehicle including, but not limited to, a pressure differential signal 235 indicating a pressure differential across the PF 36, a PF temperature signal 240 indicating the temperature of the PF 36, and a mass air flow (MAF) rate signal 245 output from the MAF sensor 22. The pressure differential signal 235 can be determined according to a calculated difference between an inlet PF pressure sensor (not shown in FIG. 2) and an outlet PF pressure sensor (not shown not shown in FIG. 2). The PF temperature signal 24 is generated by the PF temperature sensor 46.

The CCB controller 204 executes a CCB algorithm to compensate or correct errors in the PM loading model utilized by the PM load controller 202. The CCB controller 204 determines a PM load rate based on the PM load signal 230 output by the PM load controller 202, and determines a soot level defined as a function of a NOx mass flow signal 247 and the PF temperature signal 240. The NOx mass flow signal 247 can be generated, for example, by the downstream NOx sensor 52. It can be appreciated, however, that the upstream NOx sensor 50 can be used in place of the downstream NOx sensor 52.

Unlike conventional exhaust treatment systems, the CCB control unit 100 further includes a CCB correction controller 206 in signal communication with the CCB controller 204. The CCB correction controller 206 is configured to improve the accuracy of a CCB algorithm applied to the PM loading model. In at least one embodiment, the CCB correction controller 206 stores a numerical correction look-up table (LUT) that is utilized to determine a correction value.

In at least one embodiment, the compensation LUT stores a plurality of compensation values that compensate for soot oxidation correction when the SCR device 30 operates at $NH_3$ slippage conditions. Each compensation value CCB compensation value is a function of the SCR temperature with respect to an $NH_3$ storage error of the SCR device 30.

The compensation values can range from high compensation values 207a to low compensation values 207d. High compensation values 207d are utilized to provide larger corrections to the initial $NH_3$ set point value. Low compensation values 207d indicate a lesser need to correct the initial $NH_3$ set point value. Based on the selected compensation value 207a-207d, a compensation signal 250 is then generated which is applied (e.g. multiplied) to the corrected NOx level signal 225 and the PM load signal 230 to generate a corrected signal 255, which is utilized by the CCB controller 204.

CCB controller 204 receives the corrected signal 255, along one or more additional signal output from various sensors or control modules described herein. For instance, the CCB controller 204 can obtain a first signal 260, e.g., an ideal soot mass signal 260, a second signal 262, e.g., a previous CCB correction signal 262, and a third signal 264, e.g., a time increment signal 264. Based on the corrected signal 255, the ideal soot mass signal 260, the previous CCB correction signal 262, and the time increment signal 264, the CCB controller 204 outputs a corrected PM load signal 266. The corrected PM load signal takes into account pressure-reducing $NO_2$ which is caused by $NH_3$ that slips from the SCR device 30. The corrected PM load signal 266 provides a more accurate indication of the PM load on the PF 36 compared to conventional exhaust treatment systems. Accordingly, the corrected PM load signal 266 is used to control the PF regeneration system 15 more efficiently, thereby improving the overall fuel economy of the vehicle.

In at least one embodiment, the CCB correction controller 206 selectively generates the compensation signal 250 in response to detecting an $NH_3$ slippage condition. The $NH_3$ slippage condition is based on, for example, a comparison (e.g., differential value) between the actual $NH_3$ 254 and the $NH_3$ set point 256 at a given inlet SCR temperature indicated by the SCR inlet temperature signal 252. In this manner, the CCB controller 206 can identify a greater likelihood of $NH_3$ slip from the SCR device 30 when the $NH_3$ load is greater than larger set point values at lower inlet temperatures, and can generate the compensation 250 when these $NH_3$ slippage conditions exist. When the $NH_3$ slippage conditions do not exist, the CCB controller 204 can apply the CCB algorithm to the PM load model absent any modification from the CCB correction controller 206. The $NH_3$ slippage condition is confirmed when the amount of $NH_3$ that exceeds the $NH_3$ set point (e.g. a $NH_3$ load differential) exceeds a threshold value. In at least one embodiment, the threshold can vary according to the current inlet temperature of the SCR and/or the given selected set point. For example, the CCB correction controller 206 can select a first threshold for a setpoint of 0.1 grams (g) of stored $NH_3$ at 375 degrees, and select a different second threshold for a setpoint of 0.5 g of stored $NH_3$ at 180 degrees. The CCB correction controller 206 can utilize various slip detection methods based on one or more different software-based analysis techniques including, but not limited to, a SCR chemical model, a NOx sensor frequency analysis, and a steady-state slip detection analysis where injection is increased or decreased based on long iterations of high NOx reading on the downstream NOx sensor.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

While the various non-limiting embodiments have been described with reference to exemplary embodiments, it will be understood by those skilled in the art that various changes may be made and equivalents may be substituted for elements thereof without departing from the scope. In addition, many modifications may be made to adapt a particulate situation or material to the teachings without departing from the essential scope thereof. Therefore, it is intended that the claims not be limited to the particulate embodiments disclosed.

What is claimed is:

1. A vehicle including an internal combustion engine, the vehicle comprising:
an exhaust treatment system comprising:
a selective catalyst reduction (SCR) device configured to receive a reductant and, to reduce oxides of nitrogen (NOx) in exhaust gas generated by the internal combustion engine in the presence of the reductant;
a particulate filter (PF) disposed downstream of the SCR device, the PF configured to collect particulate matter from the exhaust gas stream;
a regeneration system configured to increase a temperature of the PF and regenerate the PF in response to the increased temperature of the PF; and
an electronic hardware controller configured to calculate a particulate matter load value indicative of an amount of particulate matter collected in the PF, to calculate a configurable correction block (CCB) value that modifies the particulate matter load value and compensates for pressure differential variations across the PF, and to calculate a CCB correction value that modifies the CCB value and compensates for an amount of reductant that slips from the SCR device and induces the pressure differential variations, wherein the electronic hardware controller controls the regeneration system to increase the temperature of the PF based on the modified CCB value.

2. The vehicle of claim 1, wherein the PF and the SCR device are arranged according to a SCR-forward exhaust treatment architecture.

3. The vehicle of claim 2, wherein the SCR-forward exhaust treatment architecture includes a first oxidation catalyst (OC) interposed between the internal combustion engine and an inlet of the SCR device, and a second OC interposed an outlet of the SCR device and the PF.

4. The vehicle of claim 1, further comprising a temperature sensor configured to detect an inlet temperature at the inlet of the SCR device, and a reductant load sensor configured to detect an amount of the reductant stored on the SCR device, wherein the CCB correction value is based on the inlet temperature, the amount of reductant stored on the SCR device, and a reductant storage setpoint.

5. The vehicle of claim 4, wherein the reductant storage setpoint is based on an expected amount of reductant stored on the SCR device at a given inlet temperature of the SCR device.

6. The vehicle of claim 5, wherein the controller generates the CCB correction value in response to detecting a reductant slippage condition.

7. The vehicle of claim 6, wherein the reductant slippage condition is based on differential value between the reductant storage set point and the amount of reductant stored on the SCR device at a given inlet SCR temperature.

8. An automotive vehicle control system, comprising:
an SCR inlet temperature sensor configured to detect an inlet temperature of a selective catalyst reduction (SCR) device;
a reductant load sensor configured to detect an amount of reductant stored on the SCR device;
a particulate matter (PM) load controller configured to calculate a particulate matter load value indicative of an amount of particulate matter collected in a particulate filter (PF) installed on the vehicle;
a configurable correction block (CCB) controller configured to calculate a CCB value that modifies the particulate matter load value and compensates for pressure differential variations across the PF;
a CCB correction controller configured to calculate a CCB correction value that modifies the CCB value and compensates for an amount of reductant that slips from the SCR device and induces the pressure differential variations; and
an controller configured to control a regeneration system installed on the vehicle to increase the temperature of the PF thereby burning off particulate matter from the PF based on a modified CCB value.

9. The automotive vehicle control system of claim 8, wherein the CCB correction controller generates the correction signal based on a temperature signal generated by the SCR inlet temperature sensor, and a difference between an actual amount of ammonia ($NH_3$) stored on the SCR device at a given driving condition and a $NH_3$ set point of the SCR device at the given driving condition.

10. The automotive vehicle control system of claim 9, wherein the PM load controller determines the PM load based on a comparison between a PM load model and at least one measured physical property of the vehicle.

11. The automotive vehicle control system of claim 10, wherein the at least one measured physical properties of the vehicle includes at least one of a pressure differential signal indicating a pressure differential across the PF, a PF temperature signal indicating the temperature of the PF, and a mass air flow (MAF) rate of air delivered to an engine of the vehicle.

12. The automotive vehicle control system of claim 10, wherein the CCB correction controller stores a numerical correction look-up table (LUT) that is utilized to determine a correction value.

13. The automotive vehicle control system of claim 12, wherein the CCB correction controller applies the compensation signal to the corrected NOx level signal 225 and the PM load signal 230 to generate a corrected signal,
wherein the CCB controller receives the corrected signal and generates the modified CCB value based on the corrected signal.

14. A method of correcting a configurable correction block (CCB) value to reduce ammonia slip ($NH_3$) from a selective catalyst reduction (SCR) device installed on an automotive vehicle, the method comprising:
delivering a reductant into exhaust gas generated by an internal combustion engine of the vehicle;
loading the reductant on a selective catalyst reduction (SCR) device;
reducing, via the SCR device, nitrogen oxide (NOx) contained in exhaust gas produced based on the reductant;
loading particulate matter contained in the exhaust gas in a particulate filter (PF) disposed downstream from the SCR device;
calculating a particulate matter load value indicative of an amount of particulate matter collected in the PF;
calculating a CCB value that modifies the particulate matter load value and compensates for pressure differential variations across the PF;
calculating a CCB correction value that modifies the CCB value and compensates for an amount of reductant that slips from the SCR device and induces the pressure differential variations; and
increasing a temperature of the PF to burn off the loaded particulate matter based on the modified CCB value.

15. The method of claim 14, wherein the PF and the SCR device are arranged according to a SCR forward exhaust treatment architecture.

16. The method of claim 15, wherein the SCR forward exhaust treatment architecture includes a first oxidation catalyst (OC) interposed between the internal combustion engine and an inlet of the SCR device, and a second OC interposed an outlet of the SCR device and the PF.

17. The method of claim 14, further comprising:
detecting an inlet temperature at the inlet of the SCR device;
detecting an amount of the reductant stored on the SCR device;
calculating the CCB correction value based on the inlet temperature, the amount of reductant stored on the SCR device, and a reductant storage setpoint.

18. The method of claim 17, further comprising determining the reductant storage setpoint based on an expected amount of reductant stored on the SCR device at a given inlet temperature of the SCR device.

19. The method of claim 18 further comprising selectively generating the CCB correction value in response to detecting a reductant slippage condition.

20. The method of claim 19, further comprising determining the reductant slippage condition based on differential value between the reductant storage set point and the amount of reductant stored on the SCR device at a given inlet SCR temperature.

* * * * *